United States Patent
Bohman et al.

(10) Patent No.: US 7,382,251 B2
(45) Date of Patent: Jun. 3, 2008

(54) METHOD AND SYSTEM FOR ARMING A CONTAINER SECURITY DEVICE WITHOUT USE OF ELECTRONIC READER

(75) Inventors: Karl Bohman, Lake Oswego, OR (US); Stig Ekström, Järfälla (SE)

(73) Assignee: CommerceGuard AB, Bromma (SE)

( * ) Notice: Subject to any disclaimer, the term of this patent is extended or adjusted under 35 U.S.C. 154(b) by 87 days.

(21) Appl. No.: 11/099,831

(22) Filed: Apr. 6, 2005

(65) Prior Publication Data

US 2005/0253708 A1  Nov. 17, 2005

Related U.S. Application Data

(60) Provisional application No. 60/560,567, filed on Apr. 7, 2004.

(51) Int. Cl.
*G08B 13/08* (2006.01)
(52) U.S. Cl. ............... 340/545.1; 70/57.1; 70/91; 70/271; 292/207; 340/542
(58) Field of Classification Search ........... 340/539.26, 340/521, 545.2, 5.1, 686.1, 538.1, 5.72, 522.8, 340/54.5, 551, 568.1, 539.22, 542, 376, 545.1, 340/541, 572.1; 342/357.1; 410/106; 705/28, 705/13; 70/57.1, 27, 27.1, 91; 292/218, 292/207, DIG. 30
See application file for complete search history.

(56) References Cited

U.S. PATENT DOCUMENTS

| | | | |
|---|---|---|---|
| 4,688,244 | A | 8/1987 | Hannon et al. |
| 4,750,197 | A | 6/1988 | Denekamp et al. |
| 4,849,927 | A | 7/1989 | Vos |
| 4,897,642 | A | 1/1990 | DiLullo et al. |
| 5,097,253 | A | 3/1992 | Eschbach et al. |
| 5,189,396 | A | 2/1993 | Stobbe |
| 5,347,274 | A | 9/1994 | Hassett |
| 5,355,511 | A | 10/1994 | Hatano et al. |
| 5,448,220 | A | 9/1995 | Levy |

(Continued)

FOREIGN PATENT DOCUMENTS

BE 1012912 5/2001

(Continued)

OTHER PUBLICATIONS

Jenn Hann Technology Co., Ltd.; Polices and People On-line Computer System; Magnetic Spring Projector. (with English translation).

(Continued)

*Primary Examiner*—Brent A. Swarthout
(74) *Attorney, Agent, or Firm*—GE Global Patent Operation; Jonathan E. Thomas

(57) ABSTRACT

A system monitors the condition of a container. A container security device secures at least one door of the container. The container security device is programmably armed to implement the securing. The container security device is adapted to sense at least one condition of the container, transmit information relative to the at least one sensed condition to a location outside the container, and interpret the at least one sensed condition. A remote arming plug is coupled to the container security device. The remote arming plug has a unique identifier to be communicated to the container security device to initiate an arming sequence of the container security device.

31 Claims, 9 Drawing Sheets

U.S. PATENT DOCUMENTS

| | | | |
|---|---|---|---|
| 5,475,597 A | 12/1995 | Buck | |
| 5,565,858 A | 10/1996 | Guthrie | |
| 5,602,526 A | 2/1997 | Read | |
| 5,615,247 A * | 3/1997 | Mills | 455/411 |
| 5,686,888 A | 11/1997 | Welles, II et al. | |
| 5,712,789 A | 1/1998 | Radican | |
| 5,828,322 A | 10/1998 | Eberhard | |
| 5,831,519 A | 11/1998 | Pedersen et al. | |
| 5,869,908 A * | 2/1999 | Moczygemba et al. | 307/10.5 |
| 5,959,568 A | 9/1999 | Woolley | |
| 6,069,563 A * | 5/2000 | Kadner et al. | 340/571 |
| 6,211,907 B1 | 4/2001 | Scaman et al. | |
| 6,265,973 B1 * | 7/2001 | Brammall et al. | 340/568.1 |
| 6,266,008 B1 | 7/2001 | Huston et al. | |
| 6,281,793 B1 * | 8/2001 | Haimovich et al. | 340/545.1 |
| 6,400,266 B1 | 6/2002 | Brown, Jr. | |
| 6,420,971 B1 * | 7/2002 | Leck et al. | 340/542 |
| 6,437,702 B1 | 8/2002 | Ragland et al. | |
| 6,483,434 B1 | 11/2002 | UmiKer | |
| 6,577,921 B1 | 6/2003 | Carson | |
| 6,665,585 B2 | 12/2003 | Kawase | |
| 6,687,609 B2 | 2/2004 | Hsiao et al. | |
| 6,745,027 B2 | 6/2004 | Twitchell, Jr. | |
| 6,747,558 B1 * | 6/2004 | Thorne et al. | 340/551 |
| 6,753,775 B2 * | 6/2004 | Auerbach et al. | 340/539.22 |
| 6,867,685 B1 * | 3/2005 | Stillwagon | 340/5.64 |
| 6,870,476 B2 * | 3/2005 | Cockburn et al. | 340/541 |
| 6,975,224 B2 * | 12/2005 | Galley et al. | 340/539.18 |
| 7,068,162 B2 * | 6/2006 | Maple et al. | 340/539.11 |
| 2001/0030599 A1 | 10/2001 | Zimmerman et al. | |
| 2004/0041705 A1 | 3/2004 | Auerbach et al. | |
| 2004/0066328 A1 | 4/2004 | Galley et al. | |
| 2004/0073808 A1 | 4/2004 | Smith et al. | |
| 2004/0100379 A1 | 5/2004 | Boman et al. | |
| 2004/0113783 A1 | 6/2004 | Yagesh | |
| 2004/0189466 A1 | 9/2004 | Morales | |
| 2004/0215532 A1 | 10/2004 | Boman et al. | |
| 2004/0227630 A1 | 11/2004 | Shannon et al. | |
| 2004/0233041 A1 | 11/2004 | Bohman et al. | |
| 2005/0046567 A1 | 3/2005 | Mortenson et al. | |
| 2005/0073406 A1 | 4/2005 | Easley et al. | |
| 2005/0110635 A1 | 5/2005 | Giermanski et al. | |
| 2005/0154527 A1 | 7/2005 | Ulrich | |
| 2005/0179545 A1 | 8/2005 | Bergman et al. | |

FOREIGN PATENT DOCUMENTS

| | | |
|---|---|---|
| DE | 195 04 733 A1 | 8/1996 |
| DE | 195 34 948 | 3/1997 |
| DE | 197 04 210 | 8/1998 |
| EP | 0 649 957 A2 | 4/1995 |
| EP | 0 704 712 A1 | 4/1996 |
| EP | 0 748 083 A1 | 12/1996 |
| EP | 1063627 | 12/2000 |
| EP | 1 182 154 | 2/2002 |
| EP | 1 246 094 | 10/2002 |
| GB | 1 055 457 | 1/1967 |
| GB | 2 254 506 A | 10/1992 |
| JP | 11246048 | 9/1999 |
| JP | 2001261159 | 9/2001 |
| JP | 2002039659 | 2/2002 |
| RU | 2177647 | 12/2001 |
| WO | WO 99/33040 | 7/1999 |
| WO | WO 99/38136 | 7/1999 |
| WO | WO 00/70579 | 11/2000 |
| WO | WO 01/33247 A1 | 5/2001 |
| WO | WO 02/25038 A2 | 3/2002 |
| WO | WO 02/077882 | 10/2002 |
| WO | WO-02/089084 | 11/2002 |
| WO | WO 03/023439 | 3/2003 |
| WO | WO-2004/009473 | 1/2004 |
| WO | WO-2004/066236 | 8/2004 |
| WO | WO-2005/008609 | 1/2005 |

OTHER PUBLICATIONS

Bluetooth-The Universal Radio Interface for Ad Hoc, Wireless Connectivity; Jaap Haartsen, 40 pages.

"A Software System for Locating Mobile Users: Design, Evaluation, and Lessons"; Bahl et al.; No Date; p. 1-13.

"Radar: An In-Building RF-based User Location and Tracking System"; Bahl et al.; No Date; 10 pages.

Dallas Semiconductor Maxim, "iButton Overview", XP-002340628, Aug. 10, 2003, (3 pgs.).

* cited by examiner

METHOD AND SYSTEM FOR ARMING A CONTAINER SECURITY DEVICE WITHOUT USE OF ELECTRONIC READER

CROSS-REFERENCES TO RELATED APPLICATIONS

This Application for Patent claims priority from, and hereby incorporates by reference for any purpose the entire disclosure of, co-pending Provisional Patent Application Ser. No. 60/560,567 filed on Apr. 7, 2004. This Application is related to patent application Ser. No. 10/667,282, entitled "Method And System For Monitoring Containers To Maintain The Security Thereof," filed on Sep. 17, 2003, the disclosure of which is incorporated by reference herein.

BACKGROUND

1. Technical Field

The present invention relates to a method of and system for remotely arming a container security device without the use of an electronic reader device, while not compromising the security of the system.

2. History of the Related Art

The vast majority of goods shipped throughout the world are shipped via what are referred to as intermodal freight containers. As used herein, the term "containers" includes any container (whether with wheels attached or not) that is not transparent to radio frequency signals, including, but not limited to, intermodal freight containers. The most common intermodal freight containers are known as International Standards Organization (ISO) dry intermodal containers, meaning they meet certain specific dimensional, mechanical and other standards issued by the ISO to facilitate global trade by encouraging development and use of compatible standardized containers, handling equipment, ocean-going vessels, railroad equipment and over-the-road equipment throughout the world for all modes of surface transportation of goods. There are currently more than 12 million such containers in active circulation around the world as well as many more specialized containers such as refrigerated containers that carry perishable commodities. The United States alone receives approximately six million loaded containers per year, or approximately 20,000 per day, representing nearly half of the total value of all goods received each year.

Since approximately 90% of all goods shipped internationally are moved in containers, container transport has become the backbone of the world economy.

The sheer volume of containers transported worldwide renders individual physical inspection impracticable, and only approximately 3% to 4% of containers entering the United States are actually physically inspected. Risk of introduction of a terrorist biological, radiological or explosive device via a freight container is high, and the consequences to the international economy of such an event could be catastrophic, given the importance of containers in world commerce.

Even if sufficient resources were devoted in an effort to conduct physical inspections of all containers, such an undertaking would result in serious economic consequences. The time delay alone could, for example, cause the shut down of factories and undesirable and expensive delays in shipments of goods to customers.

Current container designs fail to provide adequate mechanisms for establishing and monitoring the security of the containers or their contents. A typical container includes one or more door hasp mechanisms that allow for the insertion of a plastic or metal indicative "seal" or bolt barrier conventional "seal" to secure the doors of the container. The door hasp mechanisms that are conventionally used are very easy to defeat, for example, by drilling an attachment bolt of the hasp out of a door to which the hasp is attached. The conventional seals themselves currently in use are also quite simple to defeat by use of a common cutting tool and replacement with a rather easily duplicated seal.

A more advanced solution proposed in recent time is known as an "electronic seal" ("e-seal") The e-seals are equivalent to traditional door seals and are applied to the containers via the same, albeit weak, door hasp mechanism as an accessory to the container, but include an electronic device such as a radio or radio reflective device that can transmit the e-seal's serial number and a signal if the e-seal is cut or broken after it is installed. However, the e-seal is not able to communicate with the interior or contents of the container and does not transmit information related to the interior or contents of the container to another device. The container security device must be armed in order to be able to monitor the integrity of the container doors while the container is in transit. However, one of the challenges in implementing a global in-transit security system for freight contains is to adequately distribute the global reader infrastructure so as to be able to arm the container security device on demand anywhere in the world, i.e., to download to a given container security device an encrypted arming key that has been issued by an authorized arming server. There are hundreds of thousands of shippers of cargo containers in over 130 countries that would potentially need to use some type of reader device in order to perform such arming transactions.

This need for reader devices poses a problem when the shipper does not ship regularly and/or does not have an account with the carrier, as it becomes problematic to distribute readers. Furthermore, it is not unusual that some shippers have their location in remote places (e.g., in-land China, Africa or Latin America), where there is limited or no wired not wireless public network coverage nor Internet capability, or where such IT capabilities are too expensive. In such cases, which are not expected to be unusual or uncommon in terms of the number of locations but rather pre-dominant, it may be very difficult to distribute the readers and thus implement a global in-transit container security system.

It would therefore be advantageous to provide a method and of and system for remotely arming a container security device without use of a reader device while still maintaining a very high security and authentication process.

SUMMARY OF THE INVENTION

These and other drawbacks are overcome by embodiments of the present invention, which provides a method of and system for efficiently and reliably monitoring a container and its contents as well as tracking containers to maintain the security thereof. More particularly, one aspect of the invention includes a system for monitoring the condition of a container. A container security device secures at least one door of the container. The container security device is programmably armed to implement the securing. The container security device is adapted to sense at least one condition of the container, transmit information relative to the at least one sensed condition to a location outside the container, and interpret the at least one sensed condition. A remote arming plug is coupled to the container security device. The remote arming plug has a unique identifier, or an arming key, or other data related to the arming key, to be communicated to the container security device to initiate an arming sequence of the container security device. the remote arming plug may be used as part of a mechanical seal.

In another aspect, the present invention relates to a method for monitoring the condition of a container. At least one door of the container is secured with a container security device. The container security device is adapted to sense at least one condition of the container, transmit information relative to the at least one sensed condition to a location outside the container, and interpret the at least one sensed condition. In response to a movement of a remote arming plug, an arming sequence of the container security device is initiated. The remote arming plug has a unique identifier to be communicated to the container security device to initiate an arming sequence of the container security device.

In another aspect, the present invention relates to a system for monitoring the condition of a container having a container security device for securing at least one door of the container. A user server stores a list of authorized users and issues a remote arming plug ID for a remote arming plug coupled to the container security device. In response to a movement of a remote arming plug, an arming sequence of the container security device is initiated. The remote arming plug is coupled to the container security device. The remote arming plug has a unique identifier to be communicated to the container security device to initiate an arming sequence of the container security device.

BRIEF DESCRIPTION OF DRAWINGS

A more complete understanding of exemplary embodiments of the present invention can be achieved by reference to the following Detailed Description of Exemplary Embodiments of the Invention when taken in conjunction with the accompanying Drawings, wherein.

DETAILED DESCRIPTION OF EXEMPLARY EMBODIMENTS OF THE PRESENT INVENTION

It has been found that a container security device of the type set forth, shown, and described below, may be positioned in and secured to a container for effective monitoring of the integrity and condition thereof and its contents. The container security device has to be armed with a unique electronic arming key for authentication purposes. The container security device can be armed using a reader device, in which case the arming key is retrieved and downloaded from an authentication server which issues the arming key.

Alternatively, according to embodiments of the present invention, a remote arming plug is initially coupled to the container security device. The arming key is generated in the container security device itself once the remote arming plug has been disconnected and the container's doors have been closed. Accordingly, the container security device can be armed with a unique arming key without use of a reader device. However, after the remote arming key has been generated, the remote arming key must subsequently be authenticated. As a subsequent entity in the shipping chain that has a reader interrogates the container security device, the arming key in the container security device is authenticated by the authentication server.

The container security device secures at least one door of the container. The container security device may be similar to the one disclosed in pending U.S. patent application Ser. No. 10/667,282, filed on Sep. 17, 2003, the disclosure of which is incorporated by reference herein. The container security device is armed with a unique, encrypted arming key, which ensures the security of the system. The container security device is adapted to sense at least one condition of the container, transmit information relative to the at least one sensed condition to a location outside the container, interpret the at least one sensed condition. The cornerpiece of embodiments of the present invention consists of a so-called remote remote arming plug. The remote arming plug has a unique identifier such as a unique pin combination, a serial number, etc. The remote arming plug communicates this unique identifier to the container security device via any suitable manner such as, e.g., infra-red, a wireless connection, or a physical connection. The connector could be a RS-232 connector (D-SUB) which could connect to the data port on the back of the container security device, but it could be any other type of connector and connect to other part(s) of the container security device. The remote arming plug may have a unique serial number physically marked (numbers written or bar codes) on it, as well as programmed (once) in its electronic memory.

Figure 1A:
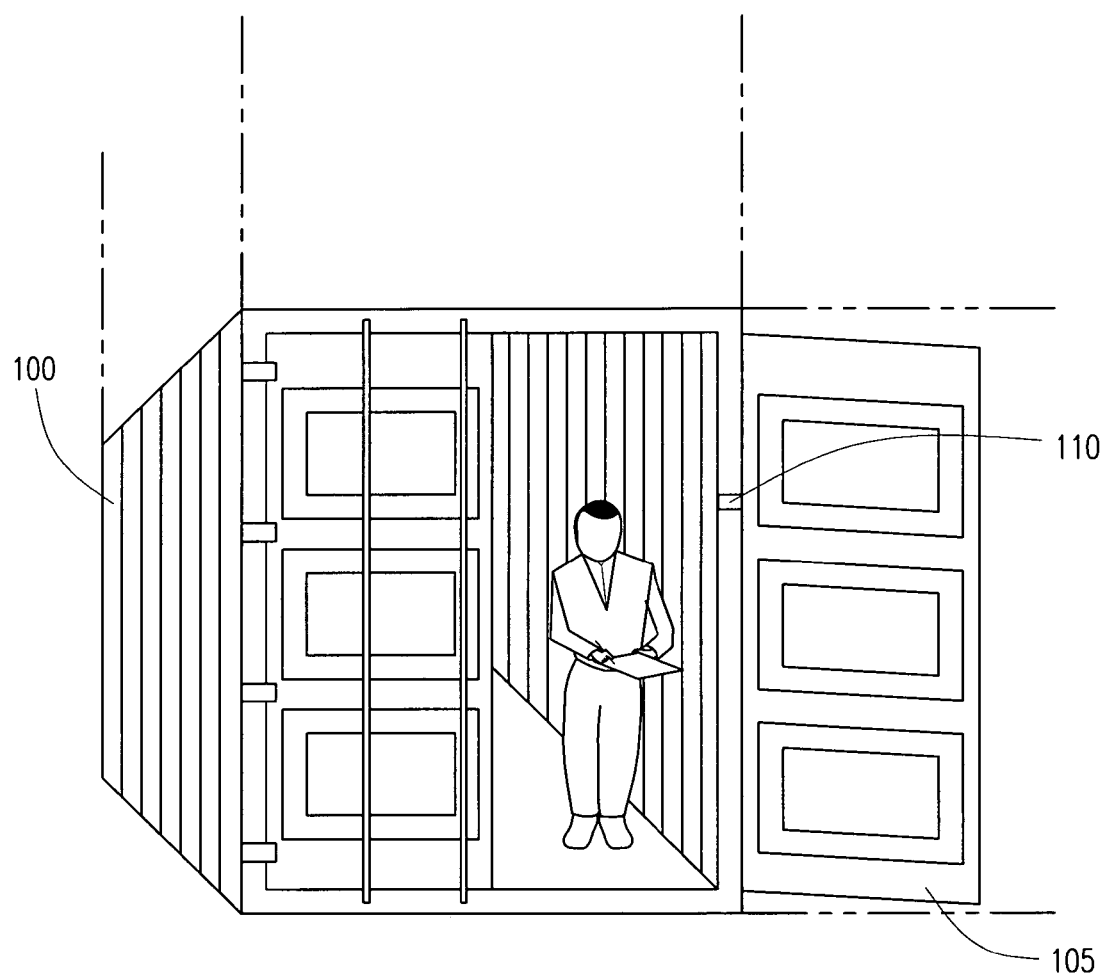
FIG. 1A is a diagram illustrating a container according to an embodiment of the invention.

FIG. 1A is a diagram illustrating a container 100 according to an embodiment of the invention. The container 100 is stuffed with various materials to be transported by a shipper. The container 100 has doors 105 that are opened when the shipper initially stuffs the container 100. A container security device 110 secures the container's 100 doors 105 after they have closed and until the container security device 110 is properly disarmed such as when, e.g., the container 100 reaches its final destination and its doors 105 need to be opened to remove the container's 100 contents. The container security device 110 will activate an alarm when the container's 100 doors 105 are opened without being properly disarmed. The container security device 110 ensures that the container 100 has not been breached after the container 100 has been secured. The process for arming the container security device 12 is described below with respect to FIGS. 3A-F.

Figure 1B:
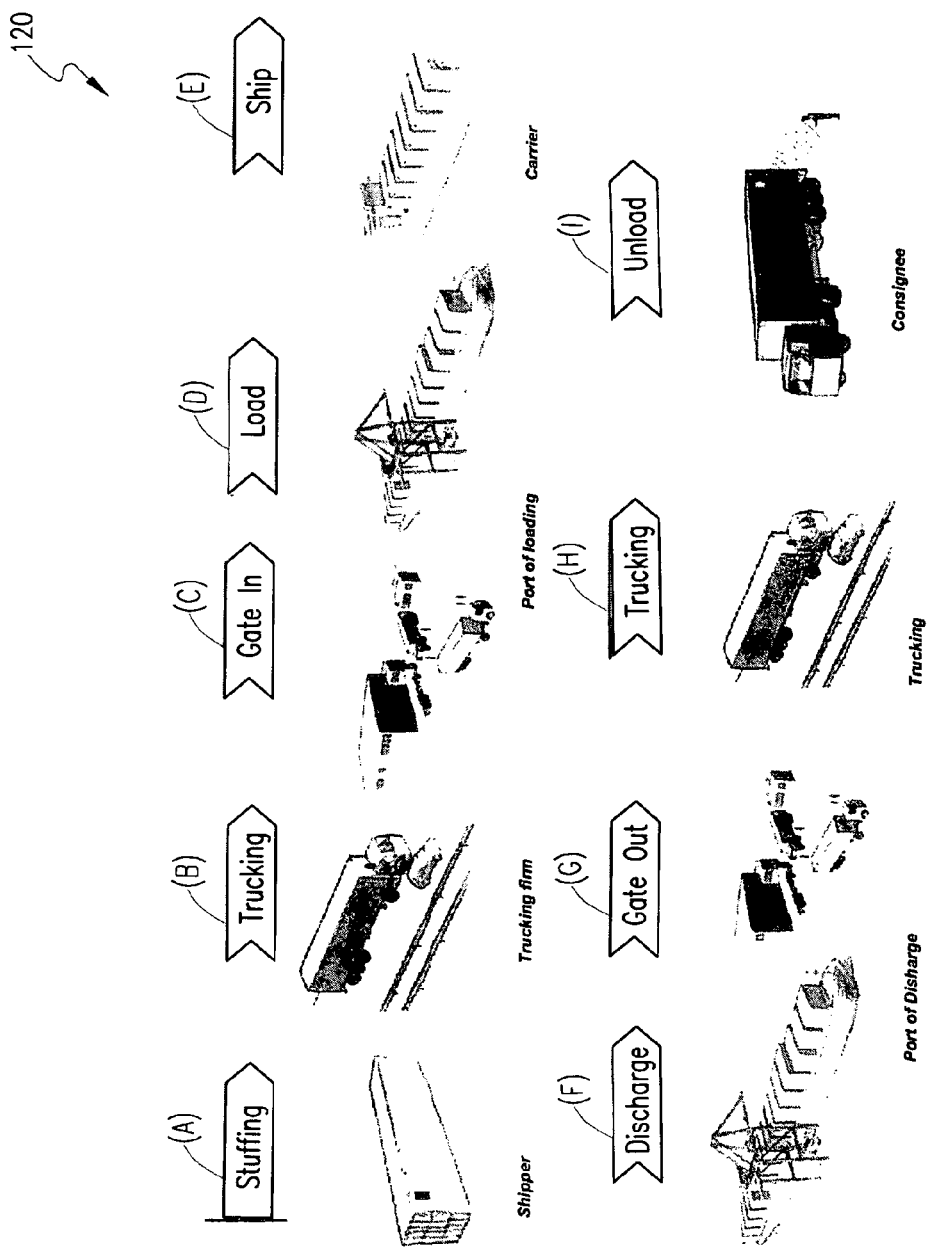
FIG. 1B illustrates a flow of an exemplary supply chain.

FIG. 1B illustrates a flow 120 of an exemplary supply chain from points (A) to (I). Referring first to point (A), the container 100 is filled with cargo by the shipper or the like. At point (B), the loaded container 100 is shipped to a port of embarkation via highway or rail transportation. At point (C), the container 100 is gated in at the port of loading such as a marine shipping yard.

At point (D), the container 100 is loaded on a ship operated by a carrier. At point (E), the container 100 is shipped by the carrier to a port of discharge. At point (F), the container 100 is discharged from the ship. Following discharge at point (F), the container 100 is loaded onto a truck and gated out of the port of discharge at point (G). At point (H), the container 100 is shipped via land to a desired location in a similar fashion to point (B). At point (I), upon arrival at the desired location, the container 100 is unloaded by a consignee.

As will be apparent to those having ordinary skill in the art, there are many times within the points of the flow 120 at which security of the container 100 could be compromised without visual or other conventional detection. In addition, the condition of the contents of the container 100 could be completely unknown to any of the parties involved in the flow 120 until point (H) when the contents of the container 100 are unloaded.

As discussed above, the container security device 110 is armed during shipping for security purposes. The container security device 110 may be armed without use of an electronic reader. Accordingly, a shipper who does not have any readers can arm the container security device 110. Instead, the container security device can be armed through use of a remote arming plug having a unique serial number, provided (a) the container security device has been pre-loaded with at least one registered key, and the unique identifier of the arming plug is associated with one of the at least one arming key; (b) the unique identifier is read from the remote arming plug and is used in the container security device to calculate a unique arming key; or (c) the container security device acquires an arming key from the remote arming plug.

Figure 1C:
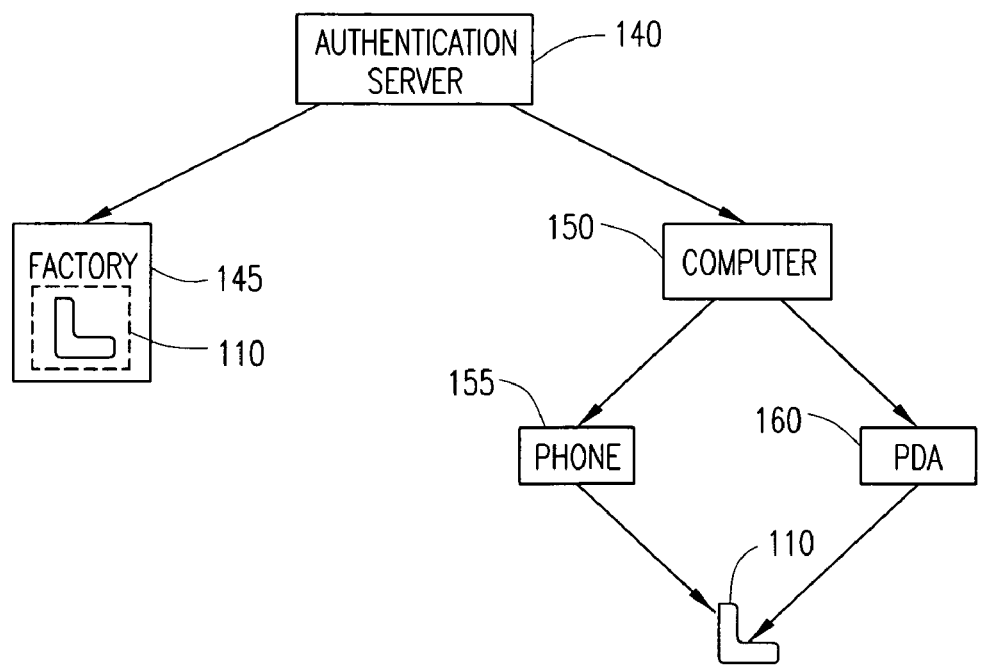
FIG. 1C illustrates a system for pre-loading keys into the container security device according to an embodiment of the invention.

FIG. 1C illustrates a system for pre-loading keys into the container security device 110 according to an embodiment of the invention. The system includes a authentication server 140. The authentication server 140 generates keys and may transmit the keys to a factory 145, where container security devices 110 are manufactured. Accordingly, the new keys may be stored directly onto the newly manufactured container security devices 110 before the container security devices 110 are used in the field. A container security device 110 that is already in use may also be re-filled with additional keys in the field. For example, the authentication server 140 may transmit additional keys to a computer 150, such as a portable laptop. The computer 150 may transmit the keys to a portable electronic device in communication with the container security device 110 being re-filled, such as phone 155 or personal digital assistance ("PDA") 160. Each key may be a unique number, and a different key may be used each time the container security device 110 is armed and a container 100 having the container security device 110 ships.

Figure 2:
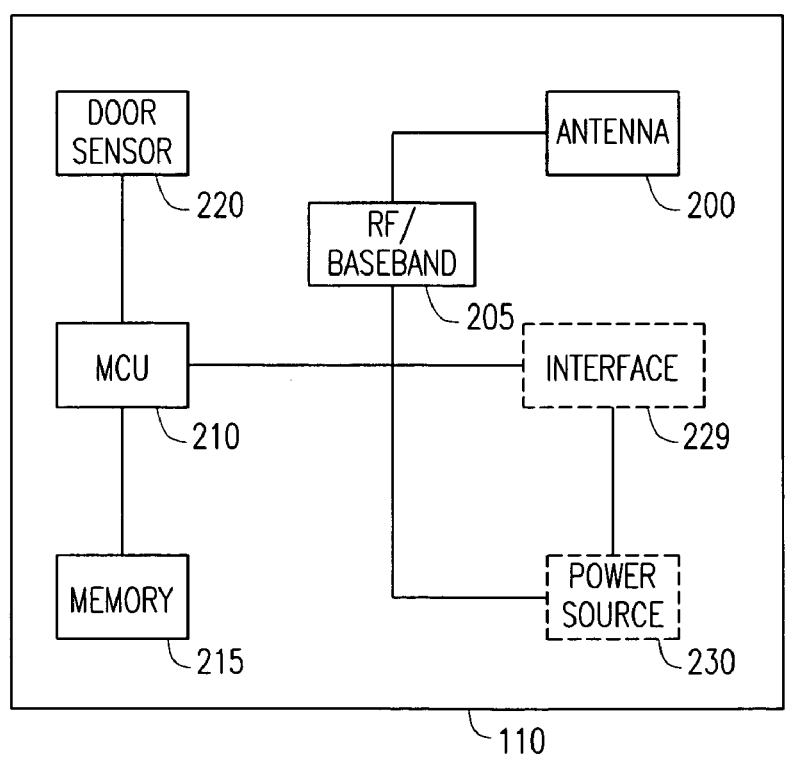
FIG. 2 is a block diagram of the container security device.

FIG. 2 is a block diagram of the container security device 110. The container security device 110 includes an antenna 200, an RF/baseband unit 205, a microprocessor (MCU) 210, a memory 215, and a door sensor 220. The container security device 110 further includes an interface 229 for attachment of additional sensors to monitor various internal conditions of the container such as, for example, temperature, vibration, radioactivity, gas detection, and motion. A remote arming plug may be coupled to the interface 229 to arm the container security device 110, as described but not limited below with respect to FIGS. 3A-F.

The container security device 110 may also include an optional power source 230 (e.g., battery); however, other power arrangements that are detachable or remotely located may also be utilized by the container security device 110. When the power source 230 includes a battery (as shown herein), inclusion of the power source 230 in the container security device 110 may help to prolong battery life by subjecting the power source 230 to smaller temperature fluctuations by virtue of the power source 230 being inside the container 100. The presence of the power source 230 within the container 100 is advantageous in that the ability to tamper with or damage the power source 230 is decreased. The container security device 110 may also optionally include a connector for interfacing directly with an electronic reader. For example, a connector may be located on an outer wall of the container 100 for access by the reader. Although not required to arm the container security device 110, the reader may connect via a cable or other direct interface to download information from the container security device 110.

The microprocessor 210 (equipped with an internal memory) discerns door 105 events from the door sensor 230, including, for example, container-disarming requests, and container-security checks. The discerned door events also include security breaches that may compromise the contents of the container 100, such as opening of a door 105 after the container 100 has been secured. The door events may be time-stamped and stored in the memory 215 for transmission to the reader. The door events may be transmitted immediately, periodically, or in response to an interrogation from the reader. The door sensor 230 shown herein is of the pressure sensitive variety, although it may be, for example, an alternative contact sensor, a proximity sensor, or any other suitable type of sensor detecting relative movement between two surfaces. The term pressure sensor as used herein thus includes, but is not limited to, these other sensor varieties.

The antenna 200 is provided for data exchange with the reader. In particular, various information, such as, for example, status and control data, may be exchanged. The microprocessor 210 may be programmed with a code that uniquely identifies the container 100. The code may be, for example, an International Standards Organization (ISO) container identification code. The microprocessor 210 may also store other logistic data, such as Bill-of-Lading (B/L), a mechanical seal number, a reader identification with a time-stamp, etc. A special log file may be generated, so that tracking history together with door 105 events may be recovered. The code may also be transmitted from the container security device 110 to the reader for identification purposes. The RF/baseband unit 205 upconverts microprocessor signals from baseband to RF for transmission to the reader.

The container security device 110 may, via the antenna 200, receive an integrity inquiry from the reader. In response to the integrity query, the microprocessor 210 may then access the memory 215 to extract, for example, door events, temperature readings, security breaches, or other stored information in order to forward the extracted information to the reader. The reader may also send a disarming request to the container security device 110. When the container 100 is armed, the memory 215 of the container security device 110 may be programmed to emit an audible or visual alarm when the door sensor 230 detects a material change in pressure after the container 100 is secured. The container security device 110 may also log the breach of security in the memory 24 for transmission to the reader. If the reader sends a disarming request to the container security device 110, the microprocessor 210 may be programmed to disengage from logging door 105 events or receiving signals from the door sensor 230 or other sensors interoperably connected to the container security device 110.

The shipper may arm a container security device 110 that has a pre-loaded security key, and the container security device 110 may be later authenticated by another entity (e.g., another entity along the supply chain) checking the container security device 110 with a reader.

Figure 3A:
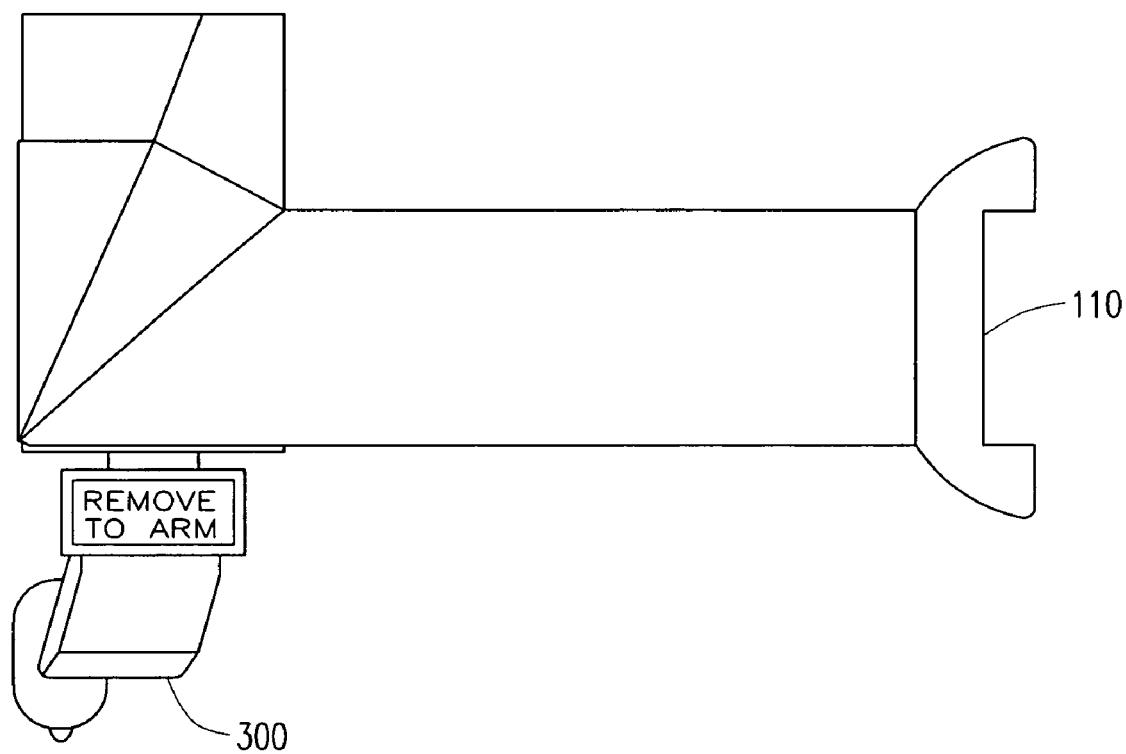
FIGS. 3A-F illustrate various views of a container security device and a remote arming plug according to an embodiment of the invention.
Figure 3B:
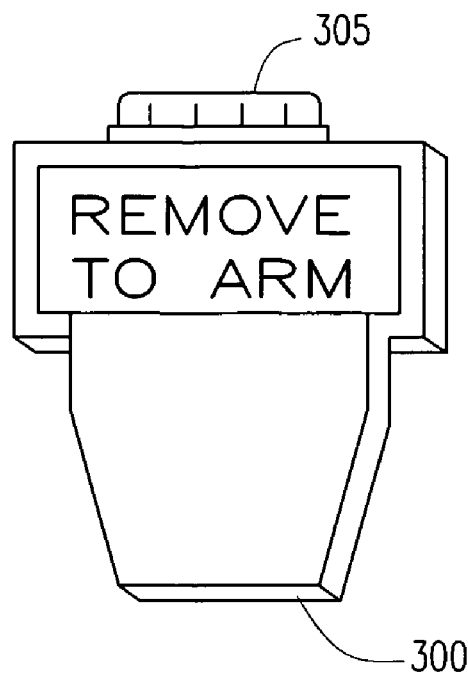
Figure 3C:
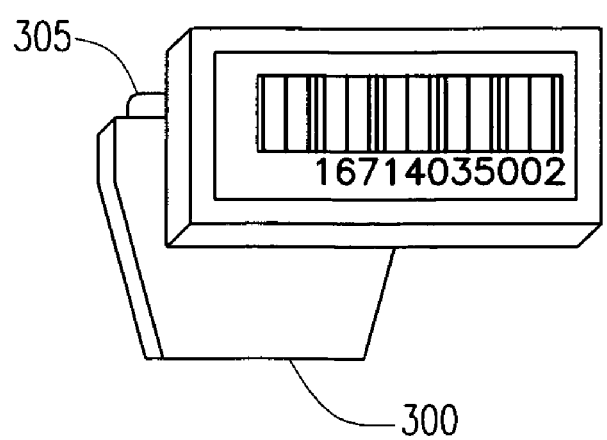

In order to arm the container security device 110 without use of a reader, a remote arming plug is required. FIG. 3A illustrates a container security device 110 and a remote arming plug 300 according to an embodiment of the invention. When the container security device 110 is mounted onto/coupled to the walls or doors 105 of the container 100, the remote arming plug 300 is initially inserted into the interface 229. The interface 229 may include a female connector, and the remote arming plug 300 may include a male connector, and the combination of active pins of the remote arming plug 300 may be utilized to uniquely identify the remote arming plug 300. The remote arming plug 300 may also include a serial number written somewhere on its body, as shown in FIGS. 3B and 3C.

Figure 3D:
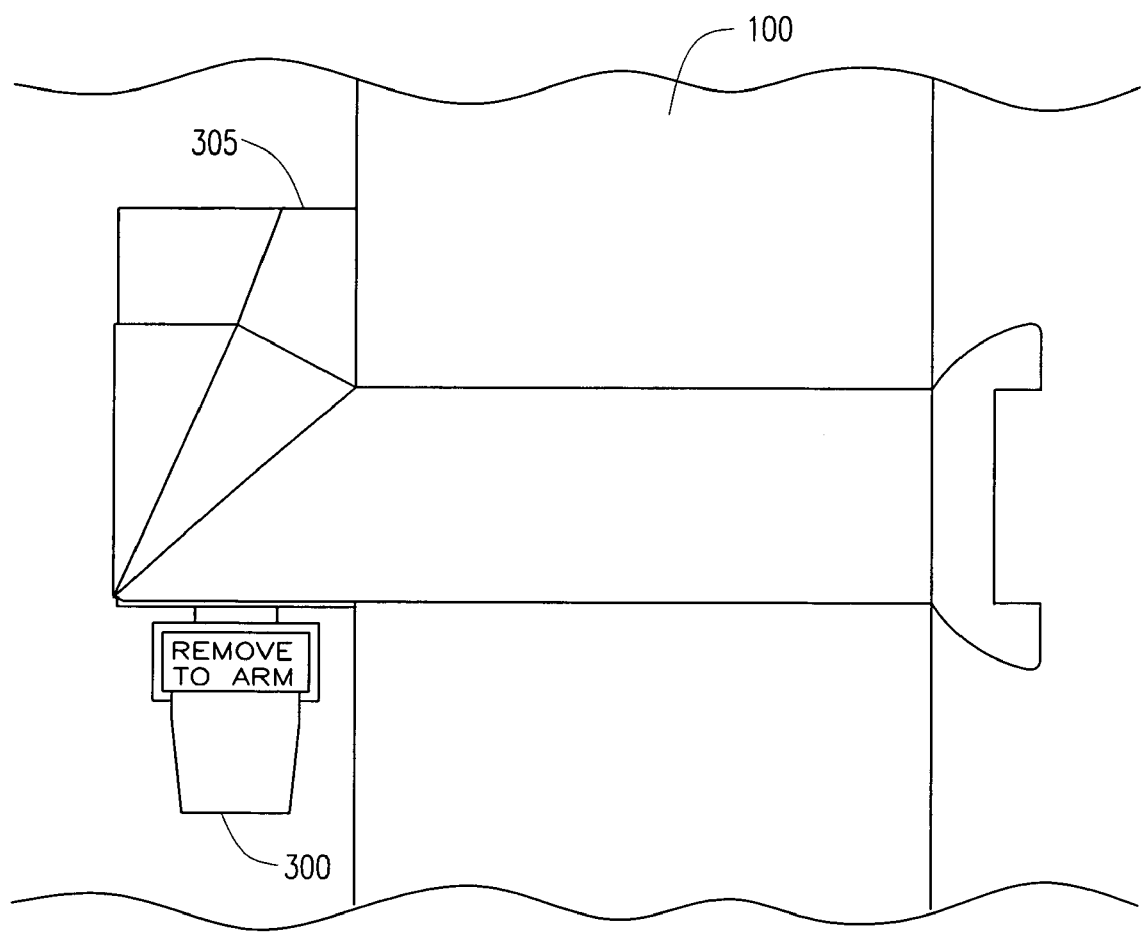
Figure 3E:
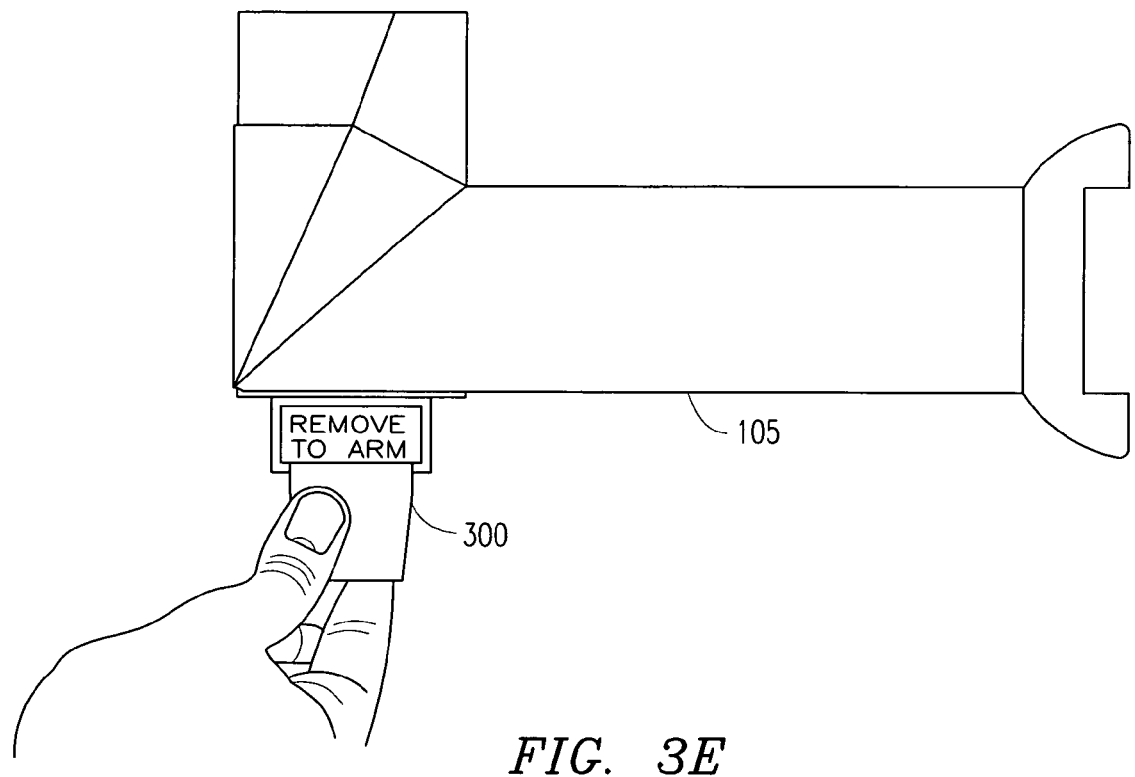
Figure 3F:
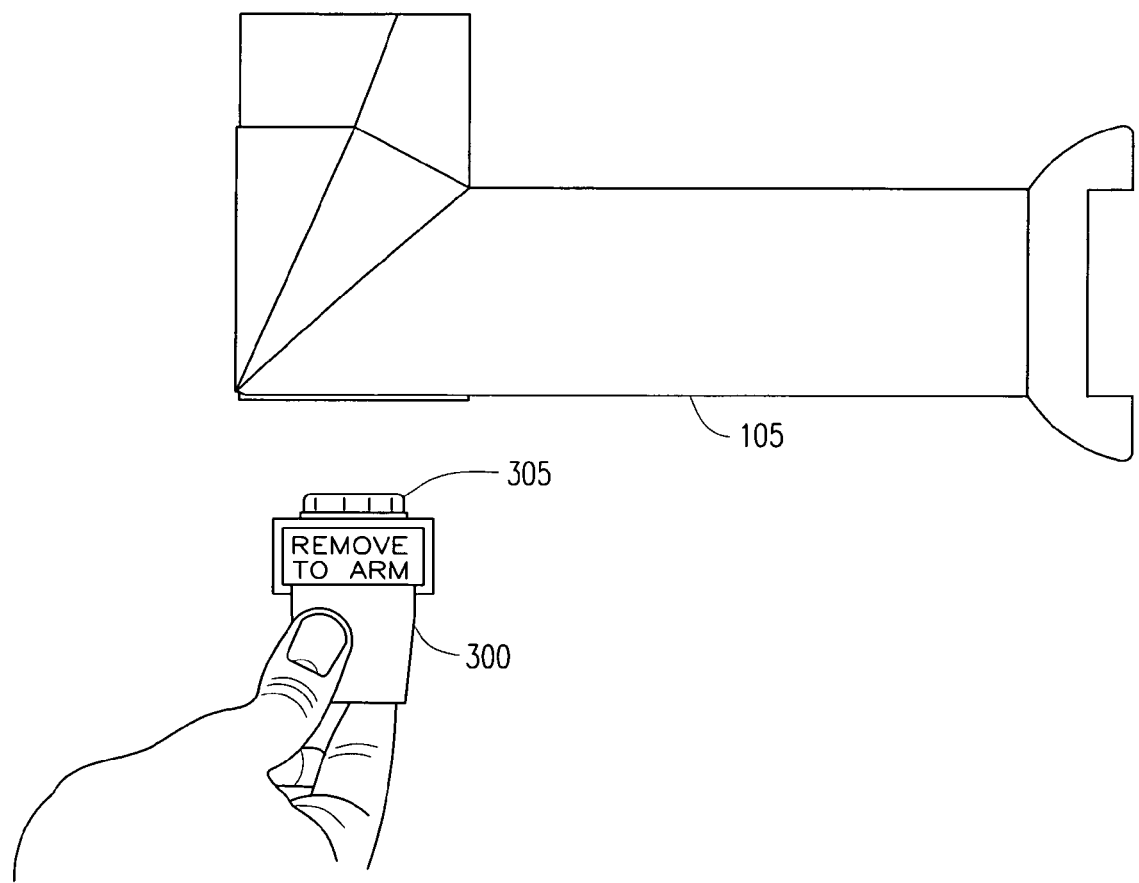

In practice, the container security device 110 is mounted onto the container's 100 walls, as shown in FIG. 3D. Once the container 100 is fully stuffed, the doors 105 are shut, and the male end 305 of the remote arming plug 300 is initially inserted into the interface 229. To arm the container security device 110, the remote arming plug 300 is removed from the interface 229. As shown in FIGS. 3E and 3F, the remote arming plug 300 may be manually removed from the container security device 10. After a short delay such as, e.g., 30 or 60 seconds, the container security device 10 is armed. Alternatively, after being de-coupled from the interface 229, the remote arming plug 300 may be in communication with other parts connected somewhere on the container security device 110 and may become a part of the mechanical seal that is used to physically seal the container door 105.

When the remote arming plug 300 is initially removed, as shown in FIGS. 3E and 3F, the container security device 110 enters a pre-armed state and then when the doors 105 are closed, after a countdown the container security device 110 enters an armed state. Alternatively, the remote arming plug 300 may remain attached to the container security device 110, as a part of the container security device's 110 mechanical seal. The doors 105 of the container security device 110 are then closed, and when pressure from the gasket of the door 105 reaches the appropriate limit for container security device 110 arming, a count-down of, e.g., 60 seconds starts.

The unique identifier of the remote arming plug 300 will communicate its identity to the container security device 110, and the container security device 110 will start its countdown timer. The container security device 110 has the necessary instructions to read the unique identifier from the remote arming plug 300 and initiate the arming process.

If the doors 105 are opened during the countdown, the arming of the container security device 110 fails. If all of the arming criteria were otherwise met, the container security device 110 automatically arms itself and thereby consumes one of the pre-loaded keys. Accordingly, the container security device 110 is now in an armed condition, which is identical to what would have happened if a reader had armed the container security device 110. If the doors 105 are opened after the container security device 110 has been armed, an alarm goes off.

The remote arming plug 300 is single-use or disposable (i.e., only good for one trip—(one "arming" and one "disarming" of the container security device 110)). The remote arming plug 300 can be viewed as the physical embodiment of an arming key, and may also be used as a ISO 17172 compliant mechanical seal. The remote arming plug 300 is physically connected to the container security device 110, e.g., (but not limited to) via the data port connector of the interface 229. The remote arming plug 300 is registered and linked to a certified shipper/user in a user server when purchased. It is possible to cross-match the shipper on a manifest so unauthorized users of remote arming plugs 300 are avoided. The unique serial number is the remote arming plug ID. The unique serial number is issued by the authentication server and there is no way to duplicate it. As discussed above, the serial number is physically written or marked (e.g. barcode) on the remote arming plug 300, and is programmed in an internal computer memory of the remote arming plug 300. The remote arming plug ID is read by and programmed in the container security device 110 once the container security device 110 is armed. The container security device 110 uses the remote arming plug ID to calculate the unique arming key. In some embodiments, the remote arming plug 300 is combined with the mechanical seal, in which case the remote arming plug ID is the mechanical seal ID. The remote arming plug ID can be read manually, wirelessly (e.g., RFID or Bluetooth), via infra-red, or via contact.

The remote arming plug 300 may be distributed to the shipper who stuffs and seals the container 100 in different ways. In a first way, the shipper utilizes an empty container 100 onto which a container security device 110 is already installed. The remote arming plug 300 would already be plugged into the container security device 110.

In a second way, the remote arming plug 300 is distributed with the container security device 110 when the container security device 110 is being recycled. The remote arming plug 300 would already be plugged into the container security device 110.

In a third way, the remote arming plug 300 is distributed in a "box" (like mechanical seals are distributed), separate from the container security device 110. The remote arming plug 300 then has to be plugged into the container security device 110 before arming.

Figure 4:
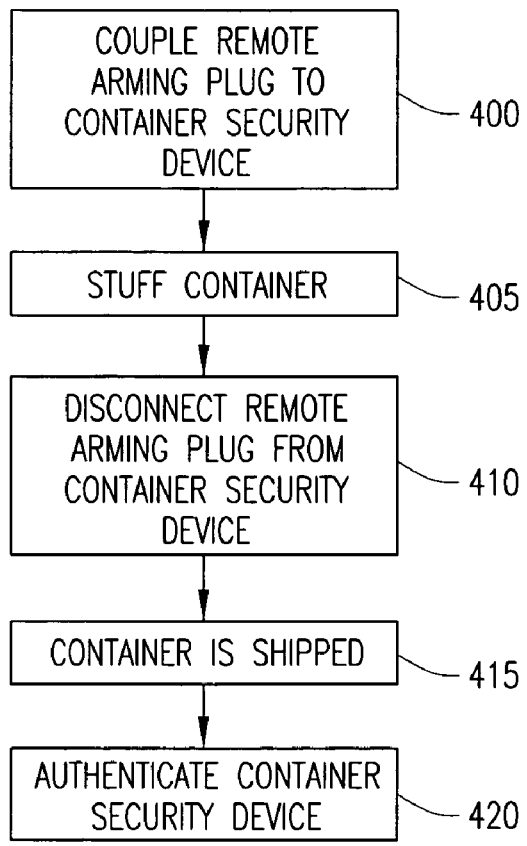
FIG. 4 illustrates the remote arming process of a container security device according to an embodiment of the invention.

FIG. 4 illustrates the remote arming process of a container security device according to an embodiment of the invention. Initially, the remote arming plug 300 and the container security device 110 are physically separate devices. At step 400, the remote arming plug 300 is coupled to the container security device 110. Specifically, the remote arming plug 300 is physically plugged into the container security device 110 by means of a connector (e.g., the connector could be made without using the RS-232 data port). The container security device 110 may be distributed to a shipper.

At step 405, the container 100 is stuffed. After the container 100 is stuffed, at step 410 the remote arming plug 300 is disconnected from the container security device 110 seconds before the container doors 105 are closed. When the container security device 110 senses the doors 105 are closed and that a remote arming plug 300 is present, the container security device 110 triggers its arming sequence by first reading the remote arming plug ID off of the remote arming plug memory. The container security device 110 generates a unique encrypted arming key by combining the remote arming plug ID and secret tag key (this process can only occur once per remote arming plug ID, meaning if a fake remote arming plug with an identical remote arming plug cannot trigger the container security device 110 to arm again). The remote arming plug ID is programmed in the container security device 110 memory as the load ID (mechanical ID). The container security device 110 is now armed. If the doors 105 are open from now on, the arming key is erased, which blocks the container security device 110 from being armed with the same remote arming plug ID as described above.

When the remote arming plug 300 is taken out of the container 100, it may be used as a part of the mechanical seal and thus used to physically seal the container doors 105 (or it is discarded). In the event that the remote arming plug 300 becomes a part of the mechanical seal after the container security device 110 has been armed, the remote arming plug ID, which is readable from the outside, now becomes the mechanical ID, which in turn is marked on the manifest (bill of lading). The manifest information along with remote arming plug ID and container ID etc. is sent or communicated to a user server, which verifies that the shipper is authorized, i.e., matches the remote arming plug ID with that user (ID). If they are not the same, then this shipment should be targeted.

The container 100 ships at step 415. At step 420, the container security device 110 is interrogated by a reader (handheld or fixed) along the supply chain, and the container security device 110 is authenticated with the authentication server 140 (using the challenge/response method). Both the container security device 110 and the remote arming plug 300 are registered in the authentication server 140. Since the container security device 110 and the authentication server 140 are using the same algorithm to calculate the arming key from remote arming plug ID, the arming key in the container security device 110 could be matched with the arming key in authentication server 140 (this is the same challenge/response method used as for container security devices 110 that have been "regularly" armed with a reader). Another thing that needs to happen when the container 100 passes a reader, is that the ID of the container security device 110 that this remote arming plug 300 was used to arm should be reported to the user server. Once both the container security device ID has been reported by a reader, and the manifest has been submitted, a comparison should be made with the manifest declared container ID and the reported ID to verify that they are the same. If they are not the same, then this shipment should be targeted. If a manifest has been submitted for a container security device 110 that is armed with a remote arming plug 300, and this manifest doesn't contain the remote arming plug ID, then this shipment should be targeted.

At the receiving end, when the mechanical seal is cut and the container doors are open at the receiver's end (without disarming the container security device 110 with a reader), the arming key is erased and container security device 110 will log an alarm. However, the physical part of the mechanical seal which is the remote arming plug 300 (not the bolt), can be used again to actually "disarm" the container security device 110 and cancel the alarm. This is done by simply plugging the remote arming plug 300 back into the container security device 110. This can only be done once and only with the doors open (and remained open for at least 30 seconds). This can only be done if container security device 110 has been armed with this remote arming plug ID, and relies on this specific sequence i.e. arming and closing with the same remote arming plug 300 (meaning one will not succeed if one tries to disarm twice). This sequence will erase the remote arming plug ID in the container security device 110, which will be logged in the container security device 110, so there is no way the container security device 110 can be "dis-armed" this way and "re-armed" by putting back a "false" remote arming plug 300 with an identical remote arming plug ID.

After the container security device 110 has been activated, the shipper has to transmit the serial number of the remote arming plug 300 to the authentication server 140 so that the container security device 110 can be authenticated by the next entity in the shipping chain that has a reader. The shipper maintains a shipping manifest which lists everything that has been stuffed into a particular container 100. The shipper also includes the serial number of the remote arming plug 300 on the shipping manifest. The shipper marks the arming plug ID on the shipping manifest. The shipping manifest is communicated to the authentication server 140 in some way (e.g., via e-mail, fax, etc.) before the authentication process can take place. The authentication process takes place the next time the container 100 passes a reader that is on-line with the authentication server 140.

Figure 5:
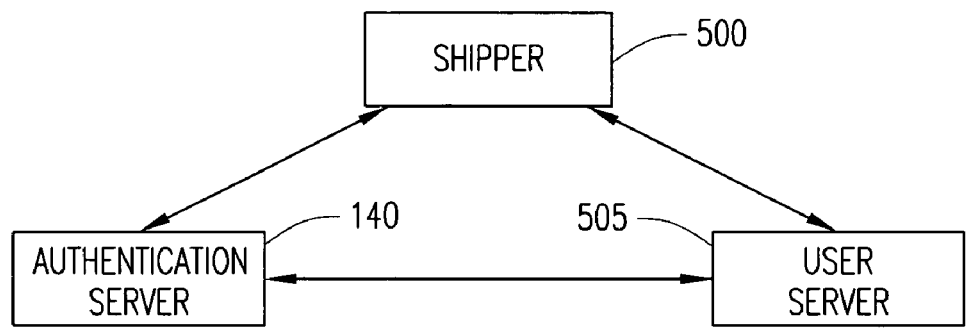
FIG. 5 illustrates the remote arming system including the shipper in communication with the authentication server and a user server.

As shown in FIG. 5, the shipper 500 is in communication with the authentication server 140 and a user server 505. The communication links may be via the Internet or a secure telephone call. Alternatively, the communication links may occur via facsimile, email, or in any other suitable manner. The user server 505 assigns remote arming plug IDs. Specifically, when the shipper purchases a remote arming plug 300, the user server assigns the ID, and the remote arming plug 300 is sent to the shipper 500. The shipper may have its own user identification number ("user ID") that uniquely identifies it. The user server 505 transmits the remote arming plug ID and the user ID to the authentication server 140. The user ID and the remote arming plug ID are both sent so that the authentication server 140 can associate the remote arming plug ID with one particular shipper.

Once the container 100 has been stuffed and its container security device 110 armed, the serial number of the remote arming plug 300 is sent from the shipper 400 to the authentication server 140 so that the serial number of the remote arming plug 300 can be registered. The shipper also sends the user ID to the authentication server 140. The user server 405 contains a list of all registered shippers. In the event that the user ID does not match any of the previously stored user IDs in the user server, an error may occur and an alarm on the container security device 110 may go off when someone in the supply chain eventually attempts to authenticate the container security device 110 with a reader.

After the container security device 110 is armed and the serial number of the remote arming plug 300 has been registered with the authentication server 140, the container security device 110 still has to be authenticated at some point by the authentication 110 server 140. A reader may be utilized for this authentication. For example, after the container 100 is shipped, a subsequent entity in the supply chain may utilize a reader to authenticate the key in the container security device 110. Specifically, the reader reads the key from the container security device 110 and transmits the key to the container security device server 140. In order to authenticate the container security device 110, the original shipper and the serial number of the remote arming plug 300 must be stored within the authentication server 140.

The next entity in the shipping chain having a reader may authenticate the container security device 110. The next entity may be located at, e.g., a distribution center or a marine terminal. If the container security device 110 has not been pre-registered properly or the arming key is authenticated by the authentication server, an alarm will be generated. During the authentication process, the container security device 110 is matched up with the serial number of the remote arming plug 300 and the user ID.

Although embodiment(s) of the present invention have been illustrated in the accompanying Drawings and described in the foregoing Detailed Description, it will be understood that the present invention is not limited to the embodiment(s) disclosed, but is capable of numerous rearrangements, modifications, and substitutions without departing from the invention defined by the following claims.

What is claimed is:

1. A system for monitoring a condition of a container, the system comprising:
a container security device for securing at least one door of the container, wherein the container security device is programmably armed to implement the securing, the container security device being adapted to sense at least one condition of the container, transmit information relative to the at least one sensed condition to a location outside the container, and interpret the at least one sensed condition; and
a remote arming plug configured to be removed from the container security device, wherein the remote arming plug has a unique identifier to be communicated, after the remote arming plug is removed, to the container security device to initiate an arming sequence of the container security device,
wherein the remote arming plug is further configured to become part of a mechanical seal utilized to physically seal the at least one door of the container after the remote arming plug is decoupled from the container security device and the at least one container door is closed.

2. The system of claim 1, wherein the container security device is adapted to read the unique identifier from the remote arming plug and to use the unique identifier to calculate a unique arming key.

3. The system of claim 1, wherein the container security device is adapted to acquire an arming key from the remote arming plug.

4. The system of claim 1, wherein the container security device has at least one preloaded arming key, and the unique identifier of the remote arming plug is associated with at least the one preloaded arming key.

5. The system of claim 1, further including an authentication server to authenticate a container security device ID of the container security device and the unique identifier of the remote arming plug, the container security device ID being associated with a container ID of the container.

6. The system of claim 5, wherein in response to the container security device being armed, the authentication server is adapted to receive the unique identifier of the remote arming plug and the container security device ID, and compare the unique identifier and the container security device ID with stored values to authenticate the container security device.

7. The system of claim 6, wherein the authentication server is adapted to initiate an actionable alarm in response to a failure to authenticate the container security device with the authentication server.

8. The system of claim 5, wherein the authentication server is adapted to receive and store, after the container security device is armed, but before the container security device is authenticated, the unique identifier of the remote arming plug and a user ID of a shipper of the container.

9. The system of claim 1, wherein the remote arming plug has a connector to connect to the container security device via at least one of a physical and a wireless connection.

10. The system of claim 1, wherein in response to the remote arming plug being decoupled from the container security device after a certain time period, and the container security device determining that the at least one door of the container is closed, the arming sequence is initiated.

11. The system of claim 8, wherein a user server authenticates the user ID of the shipper of the container, the user ID being marked on a shipping manifest for the container.

12. The system of claim 11, wherein the user server is adapted to verify that the unique identifier of the remote arming plug matches the user ID when the user server authenticates.

13. The system of claim 1, wherein the container security device is adapted, in response to the at least one condition of the container being changed to a predetermined state, to enter an alarmed state.

14. A method for monitoring a condition of a container, the method comprising:
securing at least one door of the container with a container security device, the container security device being adapted to sense at least one condition of the container, transmit information relative to the at least one sensed condition to a location outside the container, and interpret the at least one sensed condition;
initiating, in response to a movement of a remote arming plug out of a connector of the container security device, an arming sequence of the container security device, wherein the remote arming plug has a unique identifier to be communicated, after the remote arming plug is removed, to the container security device to initiate the arming sequence of the container security device;
decoupling the remote arming plug from the container security device;
closing the at least one container door; and
positioning the remote arming plug to become part of a mechanical seal that is utilized to physically seal the at least one door of the container.

15. The method of claim 14, further comprising:
reading the unique identifier from the remote arming plug; and
calculating a unique arming key using the unique identifier.

16. The method of claim 14, further comprising:
acquiring an arming key from the remote arming plug.

17. The method of claim 14, wherein the container security device has at least one preloaded arming key, the unique identifier of the arming plug is associated with one of the at least one arming key.

18. The method of claim 11, further including authenticating a container security device ID of the container security device and the unique identifier of the remote arming plug via an authentication server, the container security device ID being associated with a container ID of the container.

19. The method of claim 18, further comprising:
receiving in the authentication server, in response to the container security device being armed, the unique identifier of the remote arming plug and the container security device ID and
comparing the unique identifier and the container security device ID with stored values to authenticate the container security device.

20. The method of claim 18, further including initiating an actionable alarm in response to a failure to authenticate the container security device with the authentication server.

21. The method of claim 18, further comprising, after the container security device is armed, but before the container security device is authenticated, transmitting the unique identifier and a user ID number of a shipper of the container to the authentication server for storage.

22. The method of claim 14, further including initiating the arming sequence in response to the remote arming plug being decoupled from the container security device after a certain time period, and the container security device determining that the at least one door of the container is closed.

23. The method of claim 21, further comprising:
authenticating with a user server the user ID of the shipper of the container, the user ID being marked on a shipping manifest for the container.

24. The method of claim 23, wherein the authenticating further comprises:
verifying with the user server that the unique identifier of the remote arming plug matches the user ID.

25. The method of claim 15, further comprising:
entering the container security device into an alarmed state in response to the at least one condition of the container being changed to a predetermined state.

26. A system for monitoring the condition of a container having a container security device for securing at least one door of the container, the system comprising:
a user server for storing a list of authorized users and issuing a remote arming plug ID for a remote arming plug coupled to the container security device, wherein in response to a movement of a remote arming plug, an arming sequence of the container security device is initiated, the remote arming plug having a unique identifier to be communicated to the container security device to initiate the arming sequence; and
an authentication server to authenticate the container security device and the remote arming plug, wherein the authentication server is in communication with the user server.

27. The system of claim 26, where in response to the container security device being armed, the authentication server is adapted to receive the unique identifier of the remote arming plug and a container security device ID of the container security device, and compare the unique identifier and the container security device ID with stored values to authenticate the container security device.

28. The system of claim 27, wherein the container security device is adapted to initiate an alarm in response to a failure to authenticate the container security device with the authentication server.

29. The system of claim 27, wherein the authentication server is adapted to receive and store, after the container security device is armed, but before the container security device is authenticated, the unique identifier of the remote arming plug and a user ID of a shipper of the container.

30. The system of claim 26, wherein in response to the remote arming plug being decoupled from the container security device after a certain time period, and the container security device determining that the at least one door of the container is closed, the arming sequence is initiated.

31. The system of claim 29, wherein the user server is adapted to authenticate the user ID of the shipper of the container the user ID being marked on a shipping manifest for the container.

* * * * *